Dec. 21, 1948. W. J. KELLER ET AL 2,456,876
RAKE
Filed Oct. 27, 1944 3 Sheets-Sheet 1

INVENTORS:
WILLIAM J. KELLER.
BY NELLIE G. KELLER.
ATTORNEY.

Dec. 21, 1948.  W. J. KELLER ET AL  2,456,876
RAKE
Filed Oct. 27, 1944  3 Sheets-Sheet 2

INVENTOR.
WILLIAM J. KELLER.
BY NELLIE G. KELLER.
ATTORNEY.

Dec. 21, 1948.                W. J. KELLER ET AL                2,456,876
                                    RAKE
Filed Oct. 27, 1944                                        3 Sheets-Sheet 3

INVENTOR.
WILLIAM J. KELLER,
BY NELLIE G. KELLER.

ATTORNEY.

Patented Dec. 21, 1948

2,456,876

UNITED STATES PATENT OFFICE 2,456,876

RAKE

William J. Keller and Nellie G. Keller,
St. Louis, Mo.

Application October 27, 1944, Serial No. 560,630

2 Claims. (Cl. 56—400.17)

1

This invention relates to rakes.

Objects of our present invention are to provide a rake which will be light in weight, comparatively inexpensive in cost of manufacture, highly efficient in raking leaves and other materials, wherein the major portions of the tines of the rake will be resiliently flexible so as to yield with relation to the ground surface being raked, wherein the minor inner end portions of the tines will all be clamped and also independently secured to a metal rake head and equally spaced apart at the forward edge of the head and held against displacement along such edge in any direction, and wherein the tines will be of equal length and angularly disposed with relation to each other to effect an arc shape of the rake at the tooth end of the tines for gathering leaves and other material found on lawns and other ground surfaces.

A still further object of the invention is to provide a handle having a rake-head receiving slot and aligned bolt receiving openings, and to provide the head with two aligned bolt receiving openings adapted to register with the handle openings so that the handle can be securely held in a clamped position on the rake-head by means of a fastening device.

A still further object of the invention resides in the provision of a blanked out rake-head formed from a piece of flat sheet metal, and so shaped as to finally form a head having a bottom plate section, a top plate section, three clamping wing sections and a forward edge portion at the juncture of the top and bottom plate sections having a plurality of tine receiving openings so that minor inner portions of the tines will be securely held between the bottom and top plate sections of the rake-head.

With the above and other objects in view, the invention consists in the novel features of construction, arrangement and combination of parts hereinafter more fully described and the method of assembling the same, as finally pointed out in the claims hereto appended.

Referring to the accompanying drawings forming a part of this specification, and wherein like characters of reference denote similar parts throughout the several views.

2

Figures 6, 7:
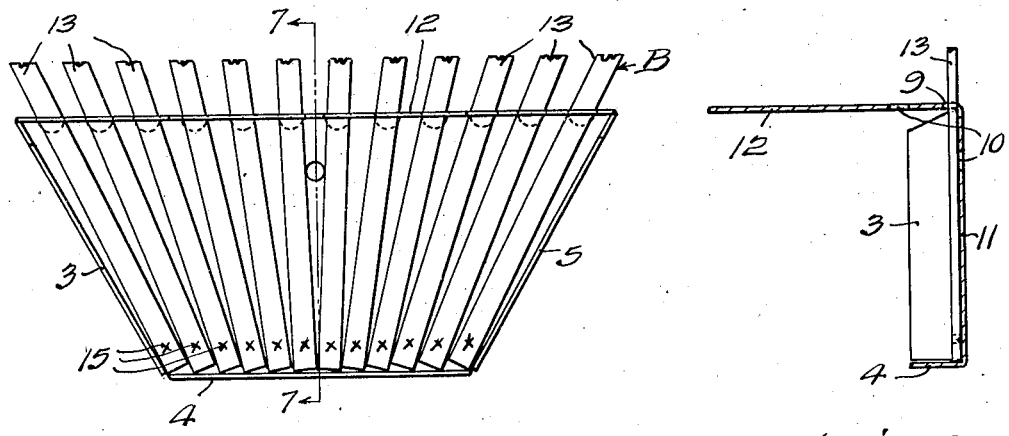

Fig. 6 is a plan view of the rake-head prior to being finally shaped and at the stage where the tines are positioned on and welded to the rake-head.

Fig. 7 is a sectional view taken on line 7—7 of Fig. 6.

Figure 8:
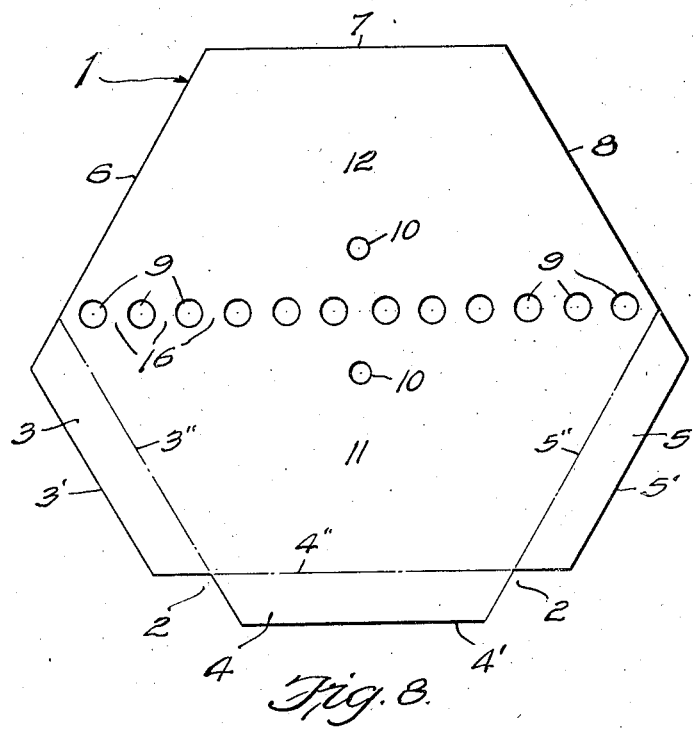

Fig. 8 is a plan view of the rake-head blank.

Figure 9:
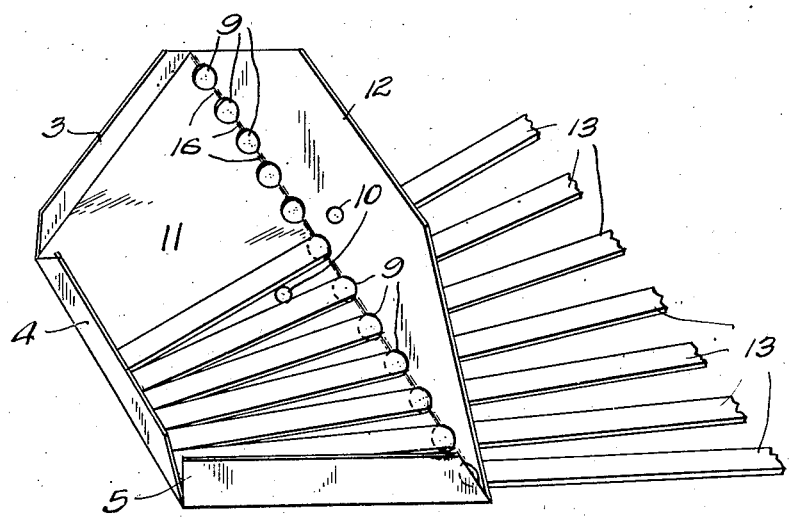

Fig. 9 is a view in perspective of the initially formed rake-head and showing part of the tines as positioned thereon before welding same to the rake-head.

The rake, in assembly, comprises a head member designated, generally as A, a plurality of tines designated, generally as B, a handle C and fastening means for securing the handle C to the head A.

The rake-head A is struck from a flat sheet of metal to form a head blank, as illustrated in Fig. 8 and designated, generally as 1, and the blank, in general, is hexagonal in outline. The blank is provided at one side thereof and at opposite corners thereof with angular cut-outs 2, providing thereby three wing sections 3, 4 and 5 within the marginal edges 3', 4' and 5' of the blank and said wing sections are bent upwardly along lines 3'', 4'' and 5'', respectively, thereby forming within the lines 3'', 4'' and 5'' and the marginal edges 6, 7 and 8 of the blank, a substantially true hexagon body portion. A plurality of openings 9 are equally spaced apart and located substantially midway of the marginal edge 7 and the line 4'' of the blank. The true hexagon body portion of the blank is provided with two openings 10 on a line vertical midway thereof, and the openings 10 are spaced an equal distance on either side of the line of openings 9. That portion of the true hexagon body portion of the blank within the marginal edges 6, 7 and 8 is initially bent upwardly along a line with the center of the openings 9 thereby dividing the true hexagon portion of the blank into a bottom head plate section 11 and an upright plate section 12.

Figures 1, 2:
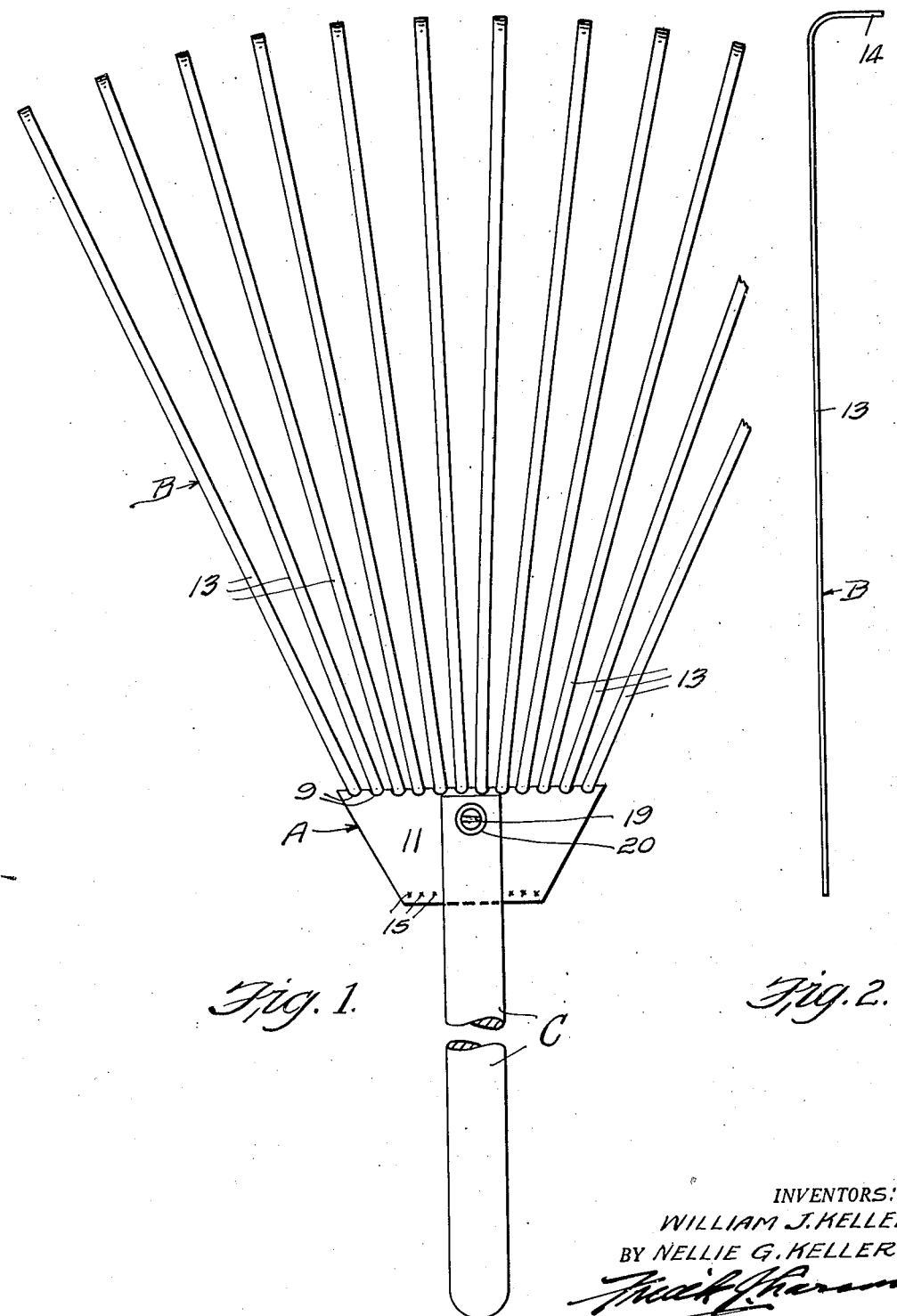
Fig. 1 is a plan view of a rake, reduced in size, embodying the features of the invention and showing the handle for the rake as partly broken away.
Fig. 2 is a side elevation of one of the tines.
Figures 3, 4, 5:
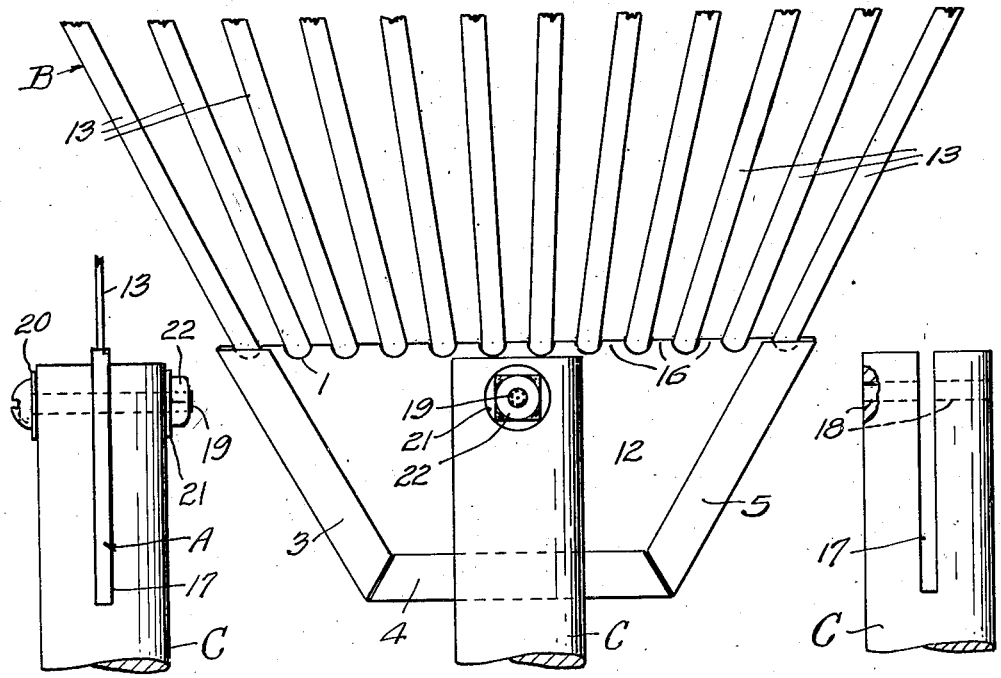
Fig. 3 is a full size fragmentary view, in side elevation, of the rake with parts thereof broken away.
Fig. 4 is a full size plan view of the rake showing the tines and the handle as partly broken away.
Fig. 5 is a side elevation of one end of the handle.

After the head A has been initially formed as outlined above with the wings 3, 4 and 5 and the top head plate section 12 standing upright, as illustrated in Figs. 7 and 9, rake tines designated 13 are passed through the head openings 9 until the inner ends thereof stop against the upright wing 4, as clearly shown in Fig. 1, which causes the tines 13 to be equally spaced apart in angular relation and causing the outer ends of the tines to line in an arc, or curve, as will be clearly apparent from Fig. 1. The forward or free ends of the rake tines 13 are curved, or bent downwardly a suitable distance to form rake teeth 14, as shown in Fig. 2. The tines are preferably made from spring steel strips and rectangular in cross-section, thus providing tines which are flexibly resilient up and down relative to each other, but not so laterally.

The inner end portions of the tines 13 are each spot welded, as at 15 to the bottom plate section, designated 11, of the head and adjacent the wing 4, as clearly shown in Fig. 6. The top plate 12 is then folded over from its upright position into contact with the tines 13 and parallel with the bottom plate section 11. After the top plate section 12 has been so positioned, the wings 3, 5 and 4 are then folded over to contact the marginal edge portions 6, 8 and 7, respectively, of the top plate 12 to stiffen the head structure A. The solid spaces between the holes 9 serve to act as spacers 16 between the tines 13 along the folded front edge of the rake head.

By projecting the inner end portions of the tines into the space between the bottom and top plates to cause the inner ends thereof to actually contact the inner face of the rear upright wing 4, and, then, by spot welding, integrally connect each tine to the bottom plate closely adjacent the rear wing, greatly strengthens the thin sheet metal head stamping; spot welding actually causes the inner end portions of the tines, at the welded points, to become integral with the bottom plate at a desirable distance from the front edge of the head so as to prevent any possible chance of any of the tines working loose from the bottom plate and becoming longitudinally displaced from pulling, pushing or side strains or stresses applied to the working ends of the tines.

After the tines 13 have been thus secured and locked between the plate sections 11 and 12 of the rake-head A, the head A is positioned in a slot 17 at one end of a handle C which is also provided with aligned openings 18. The aligned openings 18 are adapted to register with the openings 10, which openings 10 are in aligned relation after the top plate section 12 has been folded into final position.

A bolt 19 is then passed through the aligned openings 10 and 18 with a washer 20 between the head of the bolt and the handle, and then a washer 21 is applied to the free end of the threaded bolt and a nut 22 is then applied to the threaded end of the bolt and turned to home position against the last mentioned washer.

From the foregoing description, it is apparent that we have provided a rake, the many advantages of which will readily suggest themselves to those skilled in the art to which it appertains.

While we have shown the preferred embodiment of the invention in the drawings, it is to be understood that we do not wish to limit ourselves to the particular form of the different elements, as it is evident that they may be varied by substitution of mechanical equivalents and other elements adapted to perform the functions set forth, without departing from the spirit or scope of our invention, as defined in the claims hereto appended.

What we claim is:

1. In a leaf rake, a semi-hexagonally shaped head defined by folded over bottom and top plates to provide a space therebetween and having a plurality of equally spaced openings at the fold edge, the bottom plate having opposed cutouts to provide upright side wings and an upright rear wing folded over corresponding marginal edge portions of the top plate to cover and conceal corresponding marginal edge portions of the top plate, and rake tines having their inner end portions passing through the aforesaid openings into the space between the bottom and top plates and occupying the entire space between the apertured folded edge and the upright rear wing, the rear ends of the tines contacting the upright wing and each tine being integrally secured to the bottom wall closely adjacent the upright rear wing to become a unit therewith, the arrangement preventing the tines from becoming loose with relation to the bottom plate and displaced between the bottom and top plates.

2. A rake for raking leaves having, in combination, a head including a pair of panels foldably connected together and provided with equally spaced openings at the fold line, one of said panels providing a bottom plate, the other panel providing a top plate, three wings on the bottom plate foldably connected with marginal edge portions of the top plate providing thereby upright side wings and an upright rear wing for the head, rake tines passing rearwardly into the head between the bottom and top plates and projecting rearwardly for end contact with the upright rear wing, and each tine connected with the bottom wall closely adjacent the upright rear wing to become an integral part of the bottom plate at their points of connection therewith to prevent the tines from becoming loose and displaced relative to the bottom and top plates due to strains and stresses applied to the working ends of the tines.

WILLIAM J. KELLER.
NELLIE G. KELLER.

REFERENCES CITED

The following references are of record in the file of this patent:

UNITED STATES PATENTS

| Number | Name | Date |
| --- | --- | --- |
| 1,500,441 | Congable | July 8, 1924 |
| 1,887,480 | Horstman | Nov. 8, 1932 |
| 1,909,754 | Carlson | May 16, 1933 |
| 2,066,036 | Greenwood | Dec. 29, 1936 |
| 2,365,393 | Connolly | Dec. 19, 1944 |